US006866329B2

(12) United States Patent
Clifford

(10) Patent No.: US 6,866,329 B2
(45) Date of Patent: Mar. 15, 2005

(54) CARGO VEHICLE WALL

(75) Inventor: David D'Arcy Clifford, Caledonia (CA)

(73) Assignee: Dofasco Inc., Hamilton (CA)

( * ) Notice: Subject to any disclaimer, the term of this patent is extended or adjusted under 35 U.S.C. 154(b) by 0 days.

(21) Appl. No.: 10/189,460

(22) Filed: Jul. 8, 2002

(65) Prior Publication Data
US 2003/0025356 A1 Feb. 6, 2003

Related U.S. Application Data

(63) Continuation of application No. 09/342,690, filed on Jun. 29, 1999, now abandoned.

(51) Int. Cl.$^7$ .............................................. B62D 33/04
(52) U.S. Cl. ................ 296/181.1; 396/191; 396/187.03
(58) Field of Search ........................... 296/181.1, 181.2, 296/181.3, 182.1, 186.1, 187.01, 187.03, 187.12, 203.01, 203.03, 901.1, 191, 187, 188, 171

(56) References Cited

U.S. PATENT DOCUMENTS

| | | | |
|---|---|---|---|
| 2,585,976 A | 2/1952 | Teeter ......................... | 296/181 |
| 2,871,056 A | 1/1959 | Levitt ......................... | 296/181 |
| 3,055,768 A | 9/1962 | Lassiter | |
| 3,315,514 A | 4/1967 | Larsen et al. | |
| 3,674,619 A | 7/1972 | Scher et al. | |
| 3,847,724 A | 11/1974 | Powers et al. | |
| 3,962,015 A | 6/1976 | Heimann ..................... | 296/181 |
| 4,018,480 A | 4/1977 | Stone ......................... | 296/183 |
| 4,123,305 A | 10/1978 | Krzeszowski | |
| 4,188,248 A | 2/1980 | Millgardh et al. | |
| 4,212,405 A | 7/1980 | Schmidt | |
| 4,242,172 A * | 12/1980 | Fujii ........................... | 156/499 |
| 4,274,901 A | 6/1981 | Elber | |
| 4,314,002 A | 2/1982 | Oizumi et al. | |
| 4,416,949 A | 11/1983 | Gabellieri et al. | |
| 4,505,082 A * | 3/1985 | Schmitz ..................... | 52/309.8 |
| 4,588,458 A | 5/1986 | Previsani | |
| 4,626,309 A | 12/1986 | Mullen, III et al. | |
| 4,652,324 A | 3/1987 | Yamashina et al. | |
| 4,673,606 A | 6/1987 | Unden et al. | |
| 4,685,721 A | 8/1987 | Banerjea | |
| 4,898,419 A | 2/1990 | Kenmochi et al. .......... | 296/183 |
| 4,904,017 A | 2/1990 | Ehrlich ....................... | 296/181 |
| 4,940,279 A | 7/1990 | Abott et al. | |
| 5,030,488 A * | 7/1991 | Sobolev ..................... | 428/35.9 |
| 5,244,267 A * | 9/1993 | Fossier, Jr. et al. ......... | 312/231 |
| 5,433,151 A | 7/1995 | Ohara et al. ................ | 296/191 |
| 5,446,250 A | 8/1995 | Oka | |
| 5,507,405 A | 4/1996 | Thomas et al. ............. | 296/181 |
| 5,551,197 A | 9/1996 | Repp et al. | |

(List continued on next page.)

FOREIGN PATENT DOCUMENTS

| | | | | |
|---|---|---|---|---|
| GB | 1225500 | * | 3/1971 | |
| JP | 53-84069 | * | 7/1978 | ................. 428/460 |
| WO | WO 98 35114 | | 8/1998 | |

Primary Examiner—D. Glenn Dayoan
Assistant Examiner—H. Gutman
(74) Attorney, Agent, or Firm—Omar A. Nassif

(57) ABSTRACT

A cargo vehicle has lightweight rigid panels formed of metal skins and intervening paper layer. Laminate panels are formed using a heated press.

18 Claims, 2 Drawing Sheets

U.S. PATENT DOCUMENTS

| | | | |
|---|---|---|---|
| 5,690,035 A | 11/1997 | Hatayama et al. | 296/183 |
| 5,772,276 A | 6/1998 | Fetz et al. | 296/191 |
| 5,860,693 A | 1/1999 | Ehrlich | 296/193 |
| 5,863,091 A | 1/1999 | Shepherd et al. | 296/181 |
| 5,876,089 A | 3/1999 | Ehrlich | 296/181 |
| 5,938,274 A | 8/1999 | Ehrlich | 296/191 |
| 5,985,457 A | 11/1999 | Clifford | |
| 5,992,117 A | 11/1999 | Schmidt | 296/181 |
| 5,997,076 A | 12/1999 | Ehrlich | 296/191 |
| 6,010,020 A | 1/2000 | Abal | 296/181 |
| 6,024,396 A | 2/2000 | Doshi | 296/183 |
| 6,077,567 A | 6/2000 | Boerio et al. | 427/489 |
| 6,084,036 A | 7/2000 | Carney et al. | 525/454 |
| 6,171,705 B1 * | 1/2001 | Clifford | 428/464 |

* cited by examiner

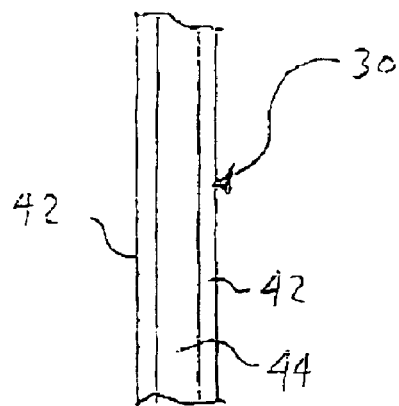
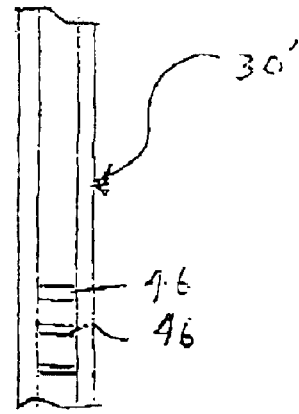
*FIG.3*  *FIG.4*
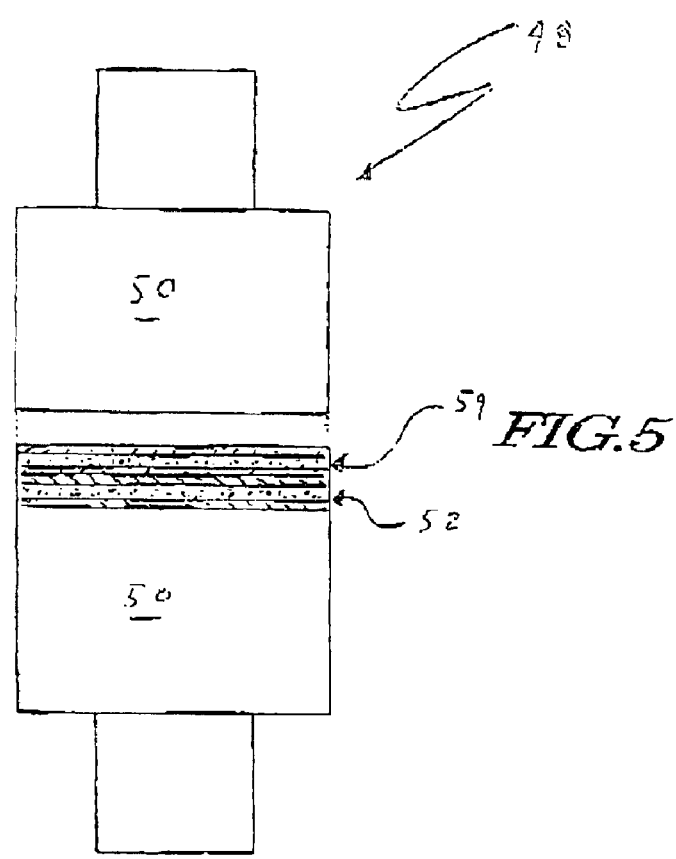
*FIG.5*

CARGO VEHICLE WALL

CROSS REFERENCE TO PATENT APPLICATION

This application is a continuation of U.S. patent application Ser. No. 09/342,690 filed Jun. 29, 1999 now abandoned, the contents of which are hereby incorporated by reference.

FIELD OF THE INVENTION

The present invention relates generally to structural walls for cargo trailers. More specifically, the present invention relates to composite laminated wall structures for cargo trailers and the like.

BACKGROUND OF THE INVENTION

Cargo vehicles are available in a number of shapes and sizes. They are generally characterized by a cab and a cargo portion. The cargo portion has walls which form an enclosure. Cargo trailers are often referred to by their shapes, such as "cube" or "high cube." A number of materials have been used in the trailer industry for constructing the walls of cargo trailers, but to Applicant's knowledge the prior art does not suggest the laminates of the present invention.

Particularly in the case of commercial cargo transport vehicles, it is important to minimize the weight of the vehicle to the extent possible. Due to the large surface area of the trailer walls, the walls contribute significantly to the overall weight of the vehicle. Many lightweight materials exist, but most cannot be used to form trailer walls due to a lack of strength. That is, in most instances it is important that trailer walls provide certain minimum structural characteristics, including resistance to punctures, adequate bending stiffness and strength and overall structural durability. While solid metal walls certainly provide the required attributes of stiffness and strength, inexpensive solid metal plates such as steel are heavy which reduces fuel efficiency and makes trailer manufacture more difficult. Moreover, lightweight exotic metals are simply too expensive to use in the construction of trailer walls.

One prior art trailer body construction is disclosed in U.S. Pat. No. 4,212,405, entitled ALUMINUM PANEL CONTAINER FOR A TRAILER BODY. Therein, a cargo-carrying container for a trailer body construction has sidewalls and inwalls consisting essentially of unitary aluminum alloy plates having a thickness of at least about 5/32". In U.S. Pat. No. 4,685,721, entitled PLATE TRAILER, there is disclosed a trailer body in which each sidewall comprises at least two groups of flat rectilinear plates of lightweight metallic material such as aluminum alloy. The plates are lined in side-by-side relation and are joined by a plurality of joining panels situated on the exterior surface of the sidewall. Each group of plates has a uniform thickness, but the plates of a first of the at least two groups are appreciably thicker than the plates of the second of the at least two groups. It is stated therein that by positioning the group of thinner plates in the region of lower stress, the total weight of the trailer can be reduced, thereby enhancing the cargo weight capacity of the trailer while retaining the high freight cubic capacity desired.

In U.S. Pat. No. 4,940,279, entitled CARGO VEHICLE WALL CONSTRUCTION, a plate wall trailer is disclosed in which each sidewall and frontwall comprises a multiplicity of composite panels. Each composite panel comprises a laminated sandwich including a polypropylene core having a preferred thickness of 0.250" and 0.040 inch aluminum face sheets adhesively attached to each surface of the polypropylene core, An epoxy adhesive having polypropylene particles dispersed therein is used to attach the aluminum face sheets to the polypropylene core. The preferred overall thickness of the disclosed composite panel is approximately 0.33".

In co-pending U.S. patent application Ser. No. 08/947,030 filed Oct. 8, 1997, entitled STRUCTURAL PANEL WITH KRAFT PAPER CORE BETWEEN METAL SKINS, which has been assigned to the assignee of the present invention and the entire disclosure of which is incorporated herein by reference, there is disclosed a new laminated material in which thin metal skins are bonded to and separated by an intervening layer of paper.

SUMMARY OF THE INVENTION

The present invention provides a cargo vehicle wall which is a laminate of metal/paper/metal. In one aspect, the metal skins are steel, with the intervening paper layer adhesively bonded to the metal skins. In one aspect, the paper layer or core is impregnated with a resin. In another aspect, the present invention provides a cargo vehicle, the enclosure of which has walls of a metal/paper/metal laminate.

The invention will now be described in its preferred embodiments with reference to the following drawings (not to scale).

BRIEF DESCRIPTION OF THE DRAWINGS

FIG. 3 illustrates a portion of the wall panel of FIG. 2 in cross-section.

FIG. 4 illustrates in cross-section a portion of a wall panel made in accordance with the present invention in another configuration.

FIG. 5 illustrates diagrammatically a press for forming the laminates of the present invention.

DETAILED DESCRIPTION OF THE PREFERRED EMBODIMENTS

Figure 1:
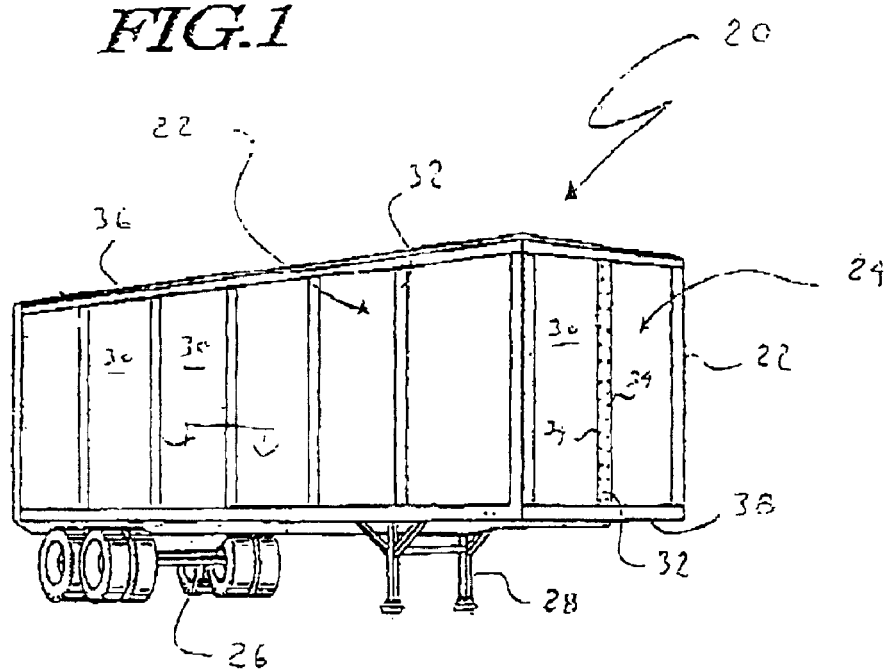
FIG. 1 depicts a perspective view of a truck trailer made in accordance with the present invention.

Referring to FIG. 1 of the drawings, trailer 20 is shown of the cargo carrying type having sidewalls 22, front wall 24 and rear doors (not shown). It is to be understood that the present invention contemplates not only plate trailers, but also sheet and post trailers and postless or "frameless" trailers. In addition, although a detachable trailer is illustrated, it is also to be understood that the present invention is useful in the construction of van-type cargo vehicles where the cargo portion is carried on the same frame as the cab. Conventional undercarriage wheel assembly 26 and landing gear 28 are shown on trailer 20.

Sidewalls 22 and front wall 24 of trailer 20 in this first preferred embodiment are composed of a plurality of panels 30 which are held together by splice plates 32. Plates 32 are riveted to panels 30 by rivets 34. Other joinder means for connecting plates 30 to form wall 22 may also be suitable such as channel posts or the like. For most trailers having the type of panel construction shown in FIG. 1, the panels will typically be from about 7 ft. to about 10 ft. in height and from about 2 ft. to about 6 ft. in width, but of course these dimensions may vary widely depending upon the specific design of the trailer.

Figure 2:
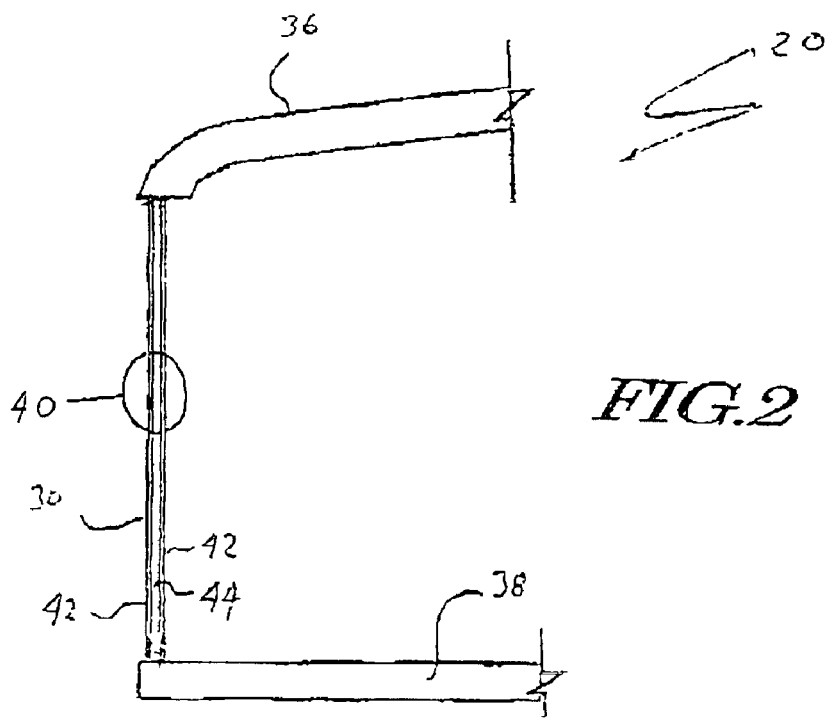
FIG. 2 illustrates a cross-section of a sidewall of the truck trailer depicted in FIG. 1.

Referring now to FIG. 2 of the drawings, a cross-section through a portion of trailer 20 is shown which illustrates roof 36 and floor 38. A generic attachment of panel 30 to roof 36 and floor 38 is shown, since a number of specific attachment means will be known by those skilled in the art based upon the teachings herein. That is, rivets, channels, adhesives, and combinations thereof as well as intervening structures can be used to arch panels 30 to roof 36 and floor 38. In addition, although a single panel 30 is shown in the drawings, it may be desirable in some applications to form an exterior wall and an interior wall, each of which could be a panel 30. Similarly, it may be desirable to form an exterior wall using panels 30 and an interior wall of another material such as plywood or the like. All such applications are contemplated as falling within the scope of the present invention.

As seen in FIG. 2, a portion 40 of panel 30 has been circled which is then enlarged in FIG. 3 for simplicity of description. With reference then to FIG. 3 of the drawings, panel 30 is shown having metal skins 42 and intervening paper core 44. It will be appreciated that panel 30 is essentially a trilaminate structure having three distinct layers which cooperate to form a functional unit. The properties of this functional unit are superior to that of its individual elements as will be more fully described herein.

One preferred construction of panels 30 is fully described in the aforementioned U.S. patent application Ser. No. 08/947,030 filed Oct. 8, 1997, which has been assigned to the assignee of the present application and the entire disclosure of which is incorporated herein by reference. Although it was previously unknown whether the laminated structures described in the foregoing patent application would have utility as trailer walls, Applicant has successfully implemented this concept in the form of trailer walls as described herein.

Referring again to FIG. 3 of the drawings, in a sheet and post trailer construction, skins 42 are most preferably formed of zinc coated steel, with each skin 42 having a thickness of from about 0.005 inch to about 0.012 inch and more preferably from about 0.006 inch to about 0.008 inch in thickness. For the sheet and post constructions intervening paper layer 44 preferably has a thickness of from about 0.01 inch to about 0.05 inch and more preferably from about 0.020 inch to about 0.030 inch. Thus, the overall thickness of panel 30 for sheet and post trailers will typically be between about 0.032 inch and about 0.046 inch. A panel having the dimensions set forth above in the description of FIG. 1 of the drawings and having the preferred layer thickness just described will typically weigh from about 0.5 lbs to about 0.8 lbs. This is compared to the weight of a single sheet of steel of about 1.3 lbs in a conventional application.

For a plate trailer, the thicknesses of the layers of panel 30 will be preferably as follows: Each metal skin 42 is preferably from about 0.007 inch to about 0.030 inch and more preferably from about 0.018 inch to about 0.026 inch, in thickness. Intervening paper layer 44 is preferably from 0.04 inch to 0.200 inch and mow preferably from 0.05 inch to 0.10 inch in thickness. For a composite trailer (postless trailer) the thicknesses of the layers of the panel will be preferably as follows: Each metal skin 42 is preferably from about 0.007 inch to about 0.030 inch and more preferably from about 0.018 inch to about 0.026 inch in thickness. Intervening paper layer 44 is preferably from 0.05 inch to 0.025 inch and more preferably from 0.08 inch to 0.22 inch in thickness.

The individual layers shown in FIG. 3 will now be described in more detail. As stated, metal skins 42 generally will be flat having planar surfaces on each side. Metals which may be utilized to form skins 42 are preferably selected from the group consisting of steel, aluminum, copper alloys and various combinations thereof. Metals which provide adequate structural and corrosion resistance properties in the invention at the lowest cost are most desirable. Most preferable is zinc coated sheet steel. As will be appreciated by those skilled in the art, steel comes in a number of grades based on the amount of carbon and other elements which it contains. Broadly these grades can be described as low carbon steel, medium steel and high carbon steel. Preferred for use herein is low carbon steel. The most preferred metal skins for use in the present invention are old roiled steel, galvanized steel, tin coated steel, and stainless steel. It may be desirable to utilize single sided galvanized sheet with a galvanized surface comprising the outer surface of skins 42 with the inner surfaces of the skins being bare metal for adhesive purposes. More preferable is differential zinc coating, i.e. a light zinc coating on the inside surface and a heavier zinc coating on the outer surface. In the present invention, differential zinc coated sheet steel is most preferred.

As will be appreciated by those skilled in the art, paper is essentially a matted or felted structure of fibrous material formed into a relatively thin sheet through the medium of a dilute suspension of pulp and water. It is composed essentially of cellulose fibers. Pulp for paper making can be prepared by grinding wood or other plant matter mechanically, by chemical processing (sulfite, kraft, or soda) and also by chemically treating cotton, linen and hemp rags, waste, straw, and the like.

In the present invention, paper formed using the kraft process is most preferred. It will be appreciated by those skilled in the art that the kraft process (which may also be referred to as sulphate pulping or alkaline process) results in papers of high physical strength and bulk. One preferred paper is sold as saturating kraft paper, by Westvaco, of Charleston, S.C.

Also, as will be appreciated by those skilled in the art, the average alignment of cellulose fibers in paper is controlled somewhat by the "machine direction" during production of the paper. It is believed that in the present invention the orientation of the paper in the laminates is a factor which may affect the stiffness and strength of the laminate. Most preferred are laminates where the machine direction of the kraft paper is a line parallel to a neutral axis of bending of the laminate.

In one preferred embodiment of the invention, paper layer 44 is provided as resin-impregnated paper. That is, the paper is saturated with a dried resin. Most preferred for use herein is phenolic resin-impregnated kraft paper. Melamine resin may also be suitable in some applications. Methods of impregnating paper with resin will be well-known to those skilled in the art. In essence, the preferred resin-impregnated paper is formed by immersing a substrate paper web in liquid phenolic resin. Typically, layers of saturated impregnated paper are layered together to form a single layer of semi-cured impregnated paper. One method of producing resin-impregnated paper is described in Canadian Patent No 2,203,200 which issued Oct. 22, 1997. Other methods of impregnation include coating and spreading the resin on the paper. Although it may be suitable or desirable in specific applications to go beyond the ranges set forth hereinafter with respect to the resin content paper layer 44, in a preferred embodiment of the present invention resin constitutes from about 15% to about 45% by weight of resin-impregnated paper 44.

In most instances thermosetting resins are preferred for use in impregnating paper layer 44, although in some applications thermoplastic resins may be acceptable. In the case of thermosetting resins, as stated the resin will generally be cured to B-state prior to forming panel 30, but it may be possible to fully cure the impregnated paper prior to the laminate pressing operation (controlled heat and pressure) described below. In the case of a phenolic resin, the resin is cured to B-stage prior to lamination. It is then fully cured as skins 42 and impregnated paper core 44 are laminated together using the press. It may be suitable in some applications to include a number of standard additives in the resin such as curing agents, fillers and the like.

With or without impregnation of paper 44, it may be desirable or required to use a layer of adhesive to bond skim 42 to paper core 44. A number of adhesives may be suitable in specific applications, including epoxies, phenolics, isocyanates, polyurethanes, and hot-melts. The adhesive may be applied to the paper or to the metal skins or both by any number of methods.

In another embodiment, and referring now to FIG. 4 of the drawings, paper layer 44 of laminate 30' has a plurality of holes 46 extending therethrough. In some applications, holes 46 provide adhesive "bridges" as more fully described in the aforereferenced U.S. patent application Ser. No. 08/947,030.

Referring now to FIG. 5 of the drawings, one method of assembling skins 42 and paper layer 30 is shown using press 48. Press 48 includes platens 50 which move towards one another in the customary manner using hydraulics or the like. Platens 50 are preferably heatable so both heat and pressure can be applied to the laminates to cure the resin and bond the adhesive. More specifically, in FIG. 5 two metal/paper/metal panels 52 and 54 are shown stacked upon each other. As stated above, the phenolic resin in the paper layer 44 is at the B stage of cure prior to the press operation and heated platens 50 complete the cure of the phenolic resin during the pressing process. Also it is to be understood that while a single paper layer 44 is shown in the drawings, typically several sheets of paper 44 will be stacked on top of each other to build layer 44 up to the preferred thickness. In some applications it may be desirable to place a layer of adhesive between each paper layer.

Referring again to FIG. 5 of the drawings, after a number of metal/paper/metal laminates are stacked (preferably from 5–20), the press closes to apply pressure to the stack. The times, temperatures and pressures will vary widely depending upon thicknesses of the skins and papers, types of resin used to impregnate the paper layers, and the type of adhesive used, if any, between the paper layer and the metal skins. The temperature used should be adequate to cure the phenolic resin fully and assure bonding of the adhesive layers, if any. For phenolic resin impregnated paper the temperature is preferably between about 175° C. and 210° C. in a low pressure press, 25 to 400 psi and more preferably, 25 to 100 psi. The time required with these preferred temperatures and pressures in order to form securely bonded laminates typically will be between 15 and 60 minutes. That is, heat and pressure will be applied typically for a period within this range. After the pressed stack is removed from the press, individual panels are then separated.

While particular embodiments of this invention are shown and described herein, it will be understood, of course, that the invention is not to be limited thereto since many modifications may be made, particularly by those skilled in this art in light of this disclosure. It is contemplated, therefore, by the appended claims, to cover any such modifications as fall within the true spirit and scope of this invention.

I claim:

1. A cargo truck enclosure, comprising:
   a plurality of panels forming said cargo thick enclosure;
   at least one of said panels being a laminated structure;
   said laminate structure having a paper layer care with opposed planar surfaces interposed between a pair of metal skins;
   said paper layer core: (i) comprising multiple paper layers adhered together, (ii) being impregnated with resin, and (iii) being adhesively bonded to said metal skins at said planar surfaces;
   said metal skins each having a thickness of from about 0.005 to about 0.030 inch; and
   said paper layer core having a thickness of from about 0.04 to about 0.20 inch.

2. The cargo truck enclosure recited in claim 1, wherein said metal skins are steel.

3. The cargo trunk enclosure recited in claim 1, wherein said metal skins are zinc coated steel.

4. The cargo truck enclosure recited in claim 1, wherein said cargo truck enclosure is a truck trailer selected from the group consisting of sheet and post trailers, plate trailers and postless trailers.

5. The cargo truck enclosure recited in claim 1, wherein a layer of adhesive is interposed between said paper core and each of said metal skins to bond each metal skin to said paper core.

6. The cargo truck enclosure recited in claim 1, wherein said paper layer core is produced from a plurality of resin impregnated paper layers.

7. The cargo truck enclosure recited in claim 1, wherein said resin impregnated paper layers contain from about 15% to about 45% by weight resin.

8. The cargo truck enclosure recited in claim 1 wherein said resin is a thermosecting resin.

9. The cargo truck enclosure recited in claim 8, wherein said thermosetting resin is selected from the group consisting of phenolic resin and melamine.

10. The cargo truck enclosure recited in claim 1, wherein the paper layers in the paper layer core comprise kraft paper.

11. A cargo truck enclosure, comprising:
    a plurality of panels forming said cargo truck enclosure;
    at least one of said panels being a laminated structure;
    said laminated structure having a paper layer core with opposed planar surfaces interposed between a pair of metal skins;
    said paper layer core: (i) comprising multiple paper layers adhered together, (ii) being impregnated with a thermoplastic resin, and (ii) being adhesively bonded to said metal skins at said planar surfaces;
    said metal skins each having a thickness of from about 0.005 to about 0.030 inch; and said paper layer core having a thickness of from about 0.04 to about 0.20 inch.

12. The cargo truck enclosure defined in claim 11, wherein the metal skins each comprise steel.

13. The cargo truck enclosure defined in claim 11, wherein the paper layers in the paper layer core comprise kraft paper.

14. The cargo truck enclosure defined in claim 11, wherein the paper layer core comprises the thermoplastic resin in an amount in the range of from about 15% to about 45% by weight.

15. A sheet and post trailer comprising the cargo truck enclosure defined in claim 11.

16. A plate trailer comprising the cargo truck enclosure defined in claim 11.

17. A postless trailer comprising the cargo truck enclosure defined in claim 11.

18. A cargo truck enclosure, comprising:
- a plurality of panels forming said cargo truck enclosure;
- at least one of said panels being a laminated structure;
- said laminated structure having a paper layer core with opposed planar surfaces interposed between a pair of steel skins;
- said paper layer core: (i) comprising multiple paper layers adhered together, (ii) being impregnated with a thermoplastic resin, and (iii) being adhesively bonded to said steel skins at said planar surfaces;
- said steel skins each having a thickness of from about 0.005 to about 0.030 inch; and said paper layer core having a thickness of from about 0.04 to about 0.20 inch.

* * * * *